Dec. 1, 1953　　S. P. RETY ET AL　　2,660,843
PACKAGING MACHINE

Filed March 28, 1952　　3 Sheets-Sheet 1

INVENTORS:
STEPHEN PAUL RETY &
JOHN FREDERICK MOORE.
BY:

Chatroin & Company.

ATTORNEYS.

Dec. 1, 1953     S. P. RETY ET AL     2,660,843
PACKAGING MACHINE
Filed March 28, 1952     3 Sheets-Sheet 3

INVENTORS:
STEPHEN PAUL RETY &
JOHN FREDERICK MOORE.
BY:
Chatwin & Company.
ATTORNEYS.

Patented Dec. 1, 1953

2,660,843

UNITED STATES PATENT OFFICE 2,660,843

PACKAGING MACHINE

Stephen Paul Rety and John Frederick Moore,
London, England

Application March 28, 1952, Serial No. 279,079

3 Claims. (Cl. 53—86)

The present invention relates to packaging machines of the kind wherein packaging material, such as cellulose, paper, metal foil, plastic or other pliable or flexible material, of strip or web form is fed in superposed layers between a pair of heated cylindrical rollers either or both of which has or have peripheral pockets which are adapted to receive tablets, or the like small articles as they are fed between the webs to the bight between the rollers as they interengage under pressure, while in the act of receiving the articles between them and the webs are sealed together by the heated rollers over areas surrounding the articles.

In machines of this kind it is known to cross hatch the periphery of each of a pair of pressure rollers over the areas not occupied by pockets so as to provide complementary crimping surfaces which mesh to produce an interdigitation of the separate layers as the latter pass through the bight of the heated rollers for the purpose of being sealed with the articles between them. This requires the application of relatively high pressure between the rollers.

The object of the present invention is to effect sealing between the webs with the aid of a relatively low pressure on the rollers whilst reducing the heat dissipation therefrom and prolonging their life.

According to the present invention sealing of the webs on receiving the articles is effected by causing them to interengage at a plurality of individually isolated zones, preferably of small magnitude, in the regions surrounding the pockets, instead of over an extensive area formed by the usual complementary crimped surfaces in said regions.

Constructionally the invention comprises a pair of peripherally engaging heated rollers either or both of which has or have spaced peripheral pockets, and having their surfaces in the non-pocketed areas formed to abut radially at individually isolated zones distributed over these areas.

Preferably the surfaces are designed to make substantially point contact at each zone, and for this purpose in a preferred form one of said rollers has fine grooves or threads extending in one direction and the other has fine grooves which extend in a direction substantially normal thereto over peripheral areas surrounding the pockets.

The invention is more particularly described by way of example with reference to the accompanying drawings in which.

Figure 1:
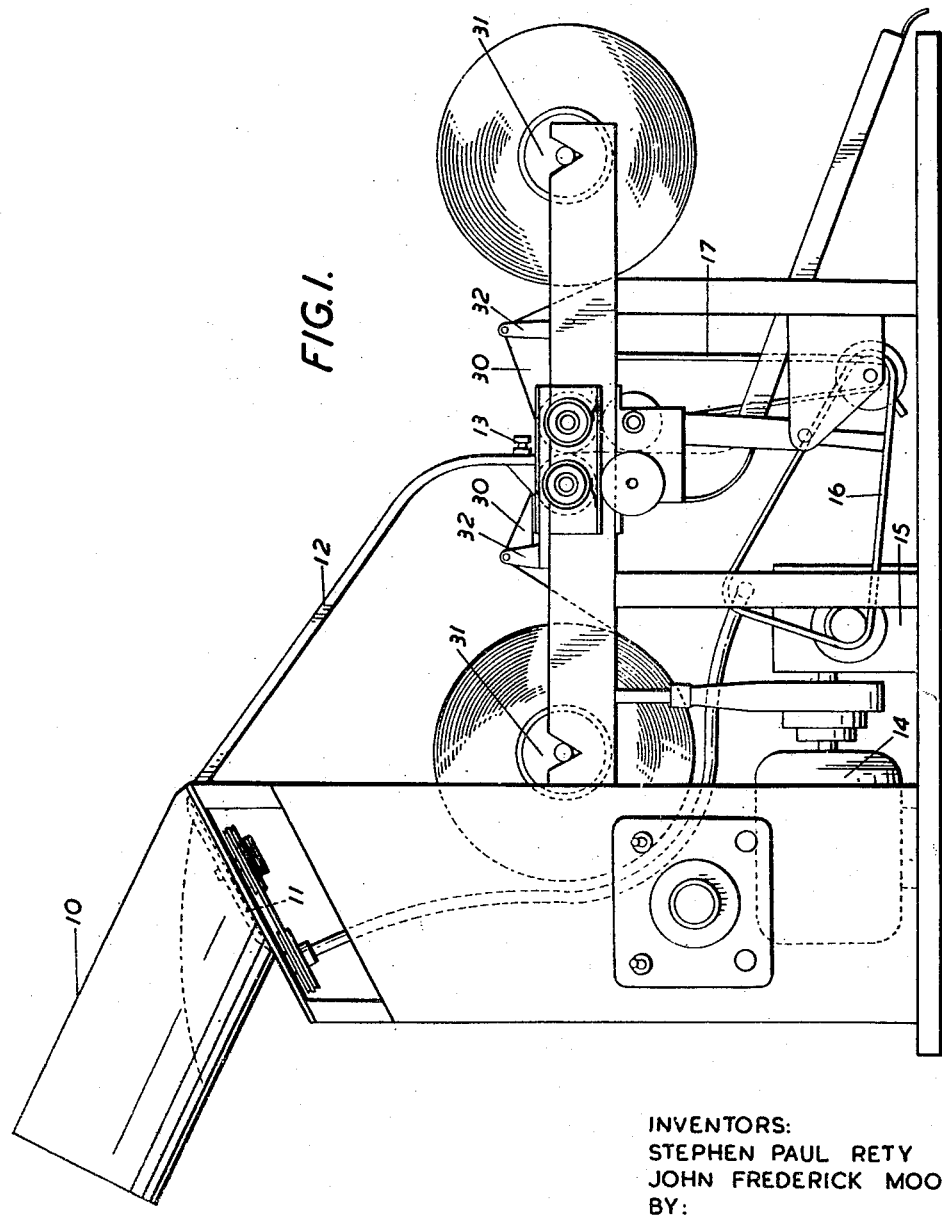
Figure 1 is a side elevation of one form of packaging machine embodying heated rollers of the present invention.

In the packaging machine illustrated in the drawings tablets or other relatively flat articles are fed in a scrambled mass to a hopper 10 from which they are individually removed in an orderly manner by a pair of oppositely rotating discs, one only of which is shown at 11, rotating about parallel axes. The tablets are transferred to a pair of chutes 12 down each of which the articles are fed in line formation.

The release of the articles one at a time from the exit end of each chute is effected by a control 13 which is operated intermittently from a motor 14 through reduction gear 15, chain drive 16 and chain drive 17, the latter driving spur or other gears (not shown) which in turn rotate a star wheel and cam follower to intermittently impart a to and fro movement to a lever 29 and simultaneously to operate the control 13 according to the outline of the star wheel. The lever 29 in its reciprocation is adapted to displace a plate relatively to a table below the chutes 12 to close or open the lower ends of the chutes with operations of the control, said plate and table being removed in order to show the relative disposition of the rollers in Figure 2.

Located below the exit ends of the chutes 12 are the cylindrical rollers 18, 19 of the present invention, these rollers similarly being rotated by spur or other wheels (not shown) which are driven by the drive 17.

Figure 3:
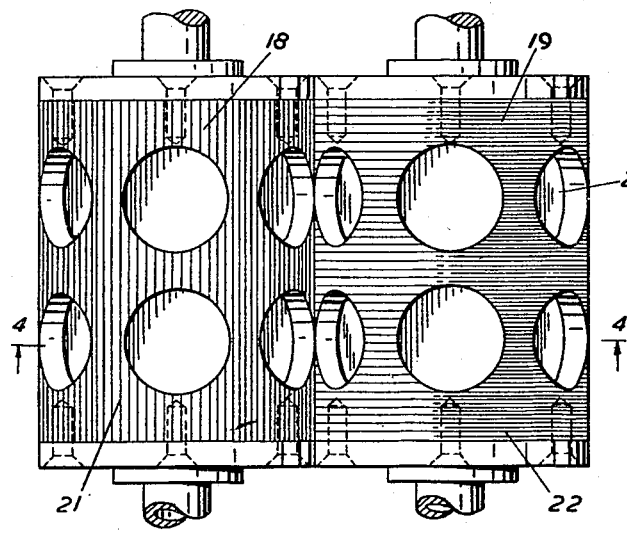
Figure 3 is a plan of a pair of interengaging rollers.
Figure 4:
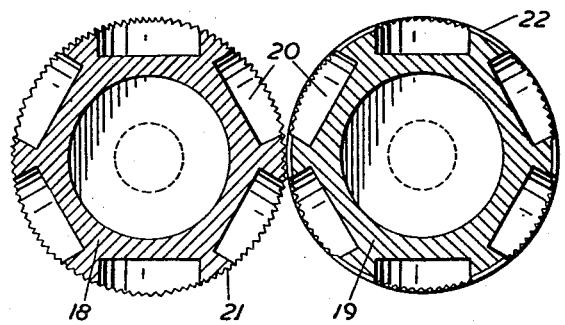
Figure 4 is a section on the line 4—4 of Figure 3.

The rollers are provided on their peripheral faces with pockets 20 each of a size greater than that of the tablets to be packaged, the number of pockets at any longitudinal section being equal to the number of chutes, that is to say where a single chute is provided for delivering tablets or other flat articles from the hopper 10 the axial length of the rollers is sufficient to provide one pocket at any longitudinal section, but whereas in the present case it is desired to package two tablets at a time each in individual pockets, a pair of chutes 12 are provided and each roller is as shown in Figure 3.

Webs 30 of plastic, cellulose, paper, metal foil or other pliable or flexible material are fed from drums 31 to the bight between the rollers 18, 19 and pass over fixed guides 32 for this purpose.

The bight between the rollers is directly below the outlet ends of the chutes 12 and the rollers 18, 19 and control 13 are so synchronised that pockets 20 of the respective rollers reach the bight between the rollers at a time when the control 13 is operated to release tablets from the chute whereby the tablets, with material from the webs 30 covering opposite faces thereof, enter the pockets which are about to be conjoined.

As will be seen from Figure 3 the roller 18 has fine longitudinal grooves or threads 21 while corresponding threads 22 are formed on the roller 19, but in a circumferential direction, that is to say at right angles to the threads 21. The threads or grooves are substantially identical in all respects except their length and direction so that at the bight between the two rollers, other than where the pockets interengage, the rollers covered by the webs 30 contact each other at a plurality of individually isolated zones each represented substantially by a point contact where a groove or thread 21 crosses a groove or thread 22.

Figure 2:
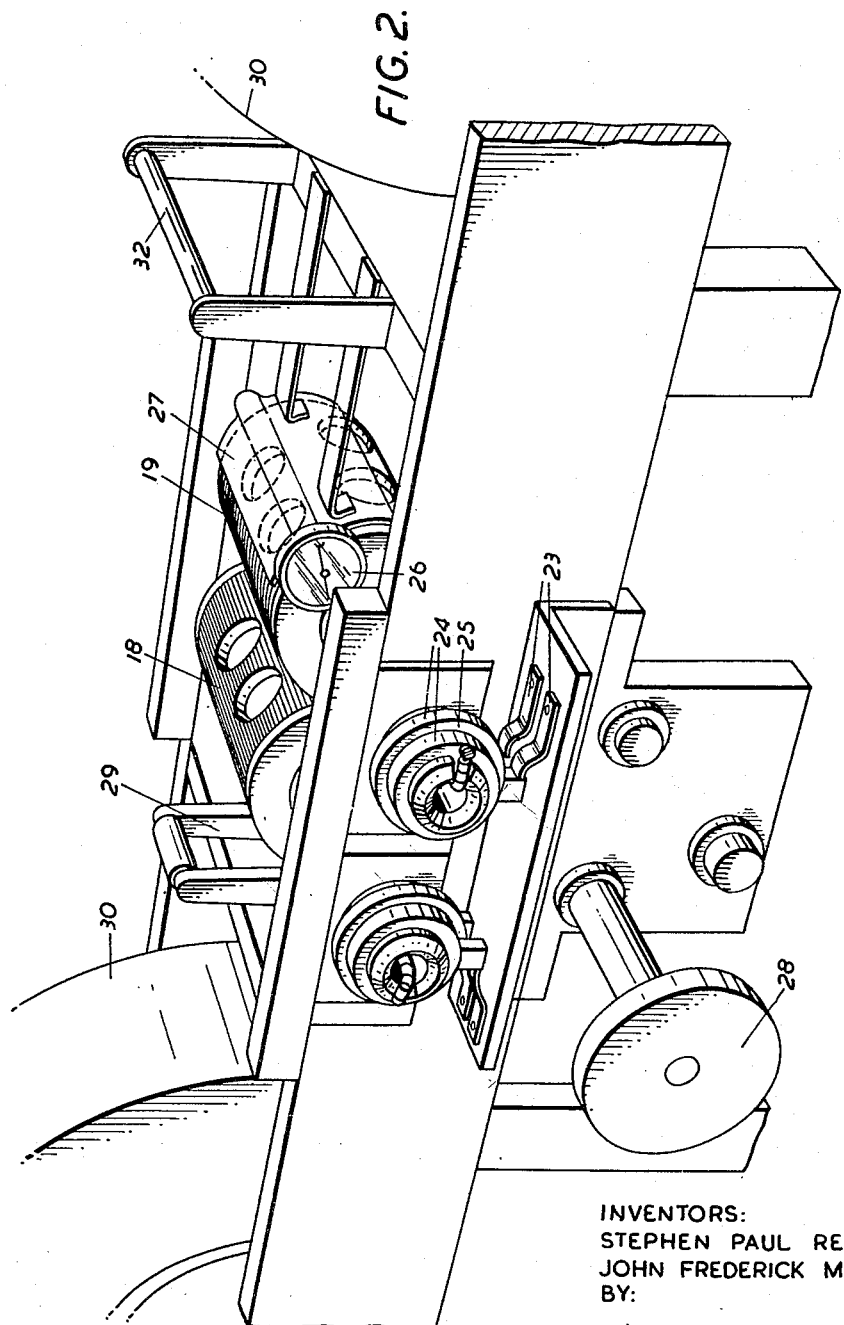
Figure 2 is a perspective view of the rollers and their heat energising means.

As may be seen from Figure 2 the heating means for the rollers is of the electrical type; thus there is provided for each roller a pair of brushes 23 which are conductively connected to a source of electrical power supply (not shown) and are adapted to engage with slip rings 24 carried by each roller separated by a spacing ring 25 of Bakelite or other insulating material, said slip rings 24 being connected in electrical conducting relationship with heater elements (not shown) but located within the rollers and adapted to operate in a manner well known in the art.

A thermometer having a dial 26 may be located externally of the roller 19 and between it and a shield 27 in order that the temperature of the rollers 18, 19 may be ascertained and controlled at any time during the operation of the machine. A manually operated control 28 may be provided for turning the rollers through gearing (not shown) independently of the motor drive should this be found necessary such as for example in the event of the displacement of the rollers 18, 19 failing to synchronise with the control 13, and causing damage to the tablets during the packaging operation.

We claim:

1. In a packaging machine of the type set forth, a pair of peripherally-abutting heated cylindrical rollers to receive therebetween superposed layers of packaging material, one of said rollers having spaced peripheral pockets to accommodate tablets to be packaged, a plurality of unbroken equally-spaced parallel ridges and furrows arranged on the cylindrical surface of one of said rollers longitudinally and parallel to the axis of rotation of said roller, and a plurality of unbroken parallel equally-spaced ridges and furrows arranged circumferentially on the cylindrical surface of the other of said rollers, said ridges constituting the only abutting areas of the rollers.

2. In a packaging machine of the type set forth, a pair of peripherally-abutting heated cylindrical rollers to receive therebetween superposed layers of packaging material, both of said rollers having spaced peripheral pockets and being arranged to rotate in synchronism so that each pocket of one roller corresponds in position as the rollers are revolved with a pocket of the other roller, said pockets serving to accommodate tablets to be packaged, a plurality of unbroken equally-spaced parallel ridges and furrows provided on the cylindrical surface of one of said rollers longitudinally and parallel to the axis of rotation of said roller, and a plurality of unbroken parallel equally-spaced ridges and furrows provided circumferentially on the cylindrical surface of the other of said rollers.

3. In a packaging machine of the type set forth, a pair of heated cylindrical rollers to receive therebetween superposed layers of packaging material, one of said rollers having spaced peripheral pockets to accommodate tablets to be packaged, a plurality of unbroken equally-spaced parallel ridges and furrows formed on the cylindrical surface of one of said rollers longitudinally and parallel to the axis of rotation of said roller, and a plurality of unbroken parallel equally-spaced ridges and furrows formed circumferentially on the cylindrical surface of the other of said rollers, the rollers being arranged to abut peripherally at the points of intersection of their ridges for compression of the superposed layers of packaging material at equally-spaced substantially point-contact areas.

STEPHEN PAUL RETY.
JOHN FREDERICK MOORE.

References Cited in the file of this patent

UNITED STATES PATENTS

| Number | Name | Date |
| --- | --- | --- |
| D. 134,061 | Salfisberg | Oct. 13, 1942 |
| 2,468,517 | Salfisberg | Apr. 26, 1949 |
| 2,545,243 | Rumsey | Mar. 13, 1951 |
| 2,546,721 | Campbell | Mar. 27, 1951 |